(12) United States Patent
Lai

(10) Patent No.: US 7,419,739 B2
(45) Date of Patent: Sep. 2, 2008

(54) FLEXIBLE BIPOLAR PLATE

(75) Inventor: Yeh-Hung Lai, Webster, NY (US)

(73) Assignee: General Motors Corporation, Detroit, MI (US)

( * ) Notice: Subject to any disclaimer, the term of this patent is extended or adjusted under 35 U.S.C. 154(b) by 521 days.

(21) Appl. No.: 10/925,753

(22) Filed: Aug. 25, 2004

(65) Prior Publication Data
US 2006/0046130 A1 Mar. 2, 2006

(51) Int. Cl.
*H01M 8/02* (2006.01)
*H01M 4/94* (2006.01)

(52) U.S. Cl. .............................. 429/38; 429/44; 429/39; 429/210

(58) Field of Classification Search ................... 429/38, 429/44, 39, 210
See application file for complete search history.

(56) References Cited

U.S. PATENT DOCUMENTS

| | | | | |
|---|---|---|---|---|
| 5,484,666 A | * | 1/1996 | Gibb et al. ............... | 429/34 |
| 5,686,200 A | * | 11/1997 | Barton et al. ............ | 429/37 |
| 6,358,642 B1 | * | 3/2002 | Griffith et al. ........... | 429/34 |
| 6,413,665 B1 | * | 7/2002 | Blanchet et al. ......... | 429/37 |
| 6,566,004 B1 | * | 5/2003 | Fly et al. ................. | 429/39 |

* cited by examiner

*Primary Examiner*—Patrick Ryan
*Assistant Examiner*—Angela Martin

(57) ABSTRACT

The present invention provides for a construction for a bipolar plate for a fuel cell stack that enables the bipolar plate to be a more compliant member in the fuel cell stack. The bipolar plate can be configured to provide varying levels of compliance, as demanded by the design of the fuel cell stack. The bipolar plate can be more compliant than the diffusion media members and the active elements used to form the individual fuel cells. The compliant nature of the individual bipolar plates enables localized dimensional changes that occur within the fuel cell stack to be compensated by a localized deformation of the portions of the bipolar plate within that region. The bipolar plate has an internal coolant flow field where some opposing pairs of lands are spaced apart with a gap therebetween while other opposing pairs of lands are in contact with one another.

28 Claims, 3 Drawing Sheets

FLEXIBLE BIPOLAR PLATE

FIELD OF THE INVENTION

The present invention relates to fuel cell stacks and, more particularly to bipolar plates used in fuel cell stacks.

BACKGROUND OF THE INVENTION

Fuel cells have been proposed as a power source for electric vehicles, stationary power supplies and other applications. One known fuel cell is the PEM (i.e., Proton Exchange Membrane) fuel cell, which is an acid-type fuel cell. Other types of fuel cells include alkaline-type, molten-carbonate-type and solid-oxide-type. A PEM fuel cell includes a so-called MEA ("membrane-electrode-assembly") comprising a thin, solid polymer membrane-electrolyte (active element) having an anode on one face and a cathode on the opposite face. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode. A diffusion media member is disposed between the MEA and each electrically conductive contact element. The diffusion media is operable to transport the fuel cell's gaseous reactants from the flow channels to the catalyst layers on the MEA. The diffusion media members require a compressive force to be exerted thereon to achieve a desired low electrical contact resistance to facilitate the collection of electrical current by the current collectors.

Fuel cell stacks typically comprise a plurality of fuel cells stacked one upon another. In PEM fuel cell stacks a plurality of the MEAs are stacked together in electrical series while being separated one from the next by an impermeable, electrically conductive contact element known as a bipolar plate or current collector. In some types of fuel cells each bipolar plate is comprised of two separate plates that are attached together with a fluid passageway (internal cavity) therebetween through which a coolant fluid flows to remove heat from both sides of the MEAs. In other types of fuel cells the bipolar plates include both single plates and attached together plates which are arranged in a repeating pattern with at least one surface of each MEA being cooled by a coolant fluid flowing through the two plate bipolar plates.

The plurality of stacked fuel cells form a fuel cell stack which is compressed to hold the plurality of fuel cells in a compressive relation. The fuel cell stack requires a significant amount of compressive force to squeeze the fuel cells of the stack together. The need for the compressive force comes about from the internal gas pressure of the reactants within the fuel cells plus the need to maintain good electrical contact between the internal components of the fuel cells.

During the manufacture of the fuel cell stack, the fuel cells are compressed to an initial compressive state. Subsequent operation of the fuel cell stack can cause the compression of the fuel cells to change. The change can occur in an overall compression of the entire fuel cell stack or in localized changes in the compressive force experienced by individual fuel cells or portions of a single fuel cell or adjacent fuel cells.

These changes in the compressive force imparted on the fuel cells and/or fuel cell stack can be detrimental. Excessive compressive forces can cause premature failure of individual fuel cells and/or the entire fuel cell stack. When the compressive forces are too low, the output of the individual fuel cells and/or the entire fuel cell stack can be degraded. Thus, it would be advantageous to compensate for the dimensional changes that occur within the fuel cell stack while maintaining the compressive force on the fuel cells and the fuel cell stack within a predetermined range.

SUMMARY OF THE INVENTION

A variety of operational factors can cause the dimensional changes to occur in the fuel cells and/or fuel cell stack. One of the causes of the dimensional changes is the temperature change that occurs during operation of the fuel cells. The various components that comprise the fuel cells may have differing thermal expansion coefficients. As a result, as temperature changes occur, the various components of the fuel cell may expand or contract at differing rates, thereby causing dimensional changes that affect the compressive force imparted on the fuel cells. Another cause of dimensional changes is the level of humidification of the active element in the fuel cells. The active element will swell as the level of humidity is increased and will shrink as the level of humidity is decreased. The swelling and shrinking of the active element can cause dimensional changes to occur which alter the compressive force imparted on the fuel cells. Furthermore, if the fuel cell stack is subjected to a freezing environment, the freezing and thawing of water within the fuel cell stack can cause dimensional changes to occur. Moreover, additional causes of dimensional changes include vibration, creep/relaxation of the components and acceleration due to impact. These dimensional changes and the ensuing compressive changes can occur across an entirety of a fuel cell stack or can occur in localized areas or regions of the fuel cell stack and/or in individual fuel cells.

The various components or elements that make up the individual fuel cells and the fuel cell stack will have differing levels of compliance. When a dimensional change causes an increase in the compressive force, the more compliant members or elements will deform as a result of the stress imparted thereon. This stress may be detrimental to the fuel cell and/or fuel cell stack. Additionally, the deformation of these more compliant elements, however, may not be elastic. Therefore, when the dimensional change is reduced or gone, the deformed elements may experience hystorisis and not return back to their original dimensions. The overall result is a reduction in the compressive force imparted in the region where the non-elastic deformation occurred.

The inventor of the present invention has learned that the diffusion media member that is utilized in the fuel cells is typically the most compliant member of the fuel cells. The diffusion media member, being the most compliant, is the component that is most readily deformed as a result of dimensional changes occurring in the fuel cells. The diffusion media element, however, does not elastically deform and, as a result, has a hystorisis once a stress caused by the dimensional changes has been removed. As a result, the compressive force imparted on the fuel cells during operation may not be optimal and may result in a reduction in the operational performance of the fuel cell and/or fuel cell stack. Furthermore, the non-elastic deformation of the diffusion media can cause localized failure in the diffusion media. Thus, it would be advantageous to form a fuel cell with a member that is more compliant than the diffusion media member or compliant enough to take up at least some of the dimensional change to avoid damaging the diffusion media member. Furthermore, it would be desirable if the more compliant member elastically deformed in response to an increasing dimensional change and returned to its nominal state when the dimensions of the fuel cells have returned to their nominal state. Moreover, it would be advantageous if the more compliant member has a compliance that maintains the compressive forces with the fuel cells and/or fuel cell stack in a predetermined range.

A fuel cell stack according to the principles of the present invention includes a bipolar plate having an anode side, a cathode side, and an internal cavity between the anode and cathode sides. There is a flow field within the internal cavity. The flow field is at least partially defined by opposing pairs of lands and opposing pairs of channels between the lands. Some of the opposing pairs of lands are in contact with one another and others of the opposing pairs of lands are spaced apart from one another with a gap therebetween.

In another aspect of the present invention, a fuel cell stack includes a bipolar plate having opposite anode and cathode surfaces. The bipolar plate has an internal coolant passageway between the anode and cathode surfaces with a coolant flow field therein. The coolant flow field is at least partially defined by opposing pairs of lands and opposing pairs of channels between the lands. There is at least one diffusion media member compressed against one of the anode and cathode surfaces of the bipolar plate. A compliance of the bipolar plate is greater than about one half of a compliance of the diffusion media member.

A method of maintaining a compression of a fuel cell stack in a predetermined range during dimensional changes in fuel cells of the fuel cell stack is disclosed. The method includes: (1) operating the fuel cell stack to meet a power demand placed on the fuel cell stack; and (2) compensating for dimensional changes with at least one of the bipolar plates thereby maintaining the compression of the fuel cell stack within the predetermined range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

The present invention relates to fuel cells, such as a PEM fuel cell, having at least one bipolar plate that is made from two individual plates and disposed between a pair of active elements, such as MEAs. The individual plates are joined together by laser welding, brazing, adhesive bonding or the like.

Figure 1:
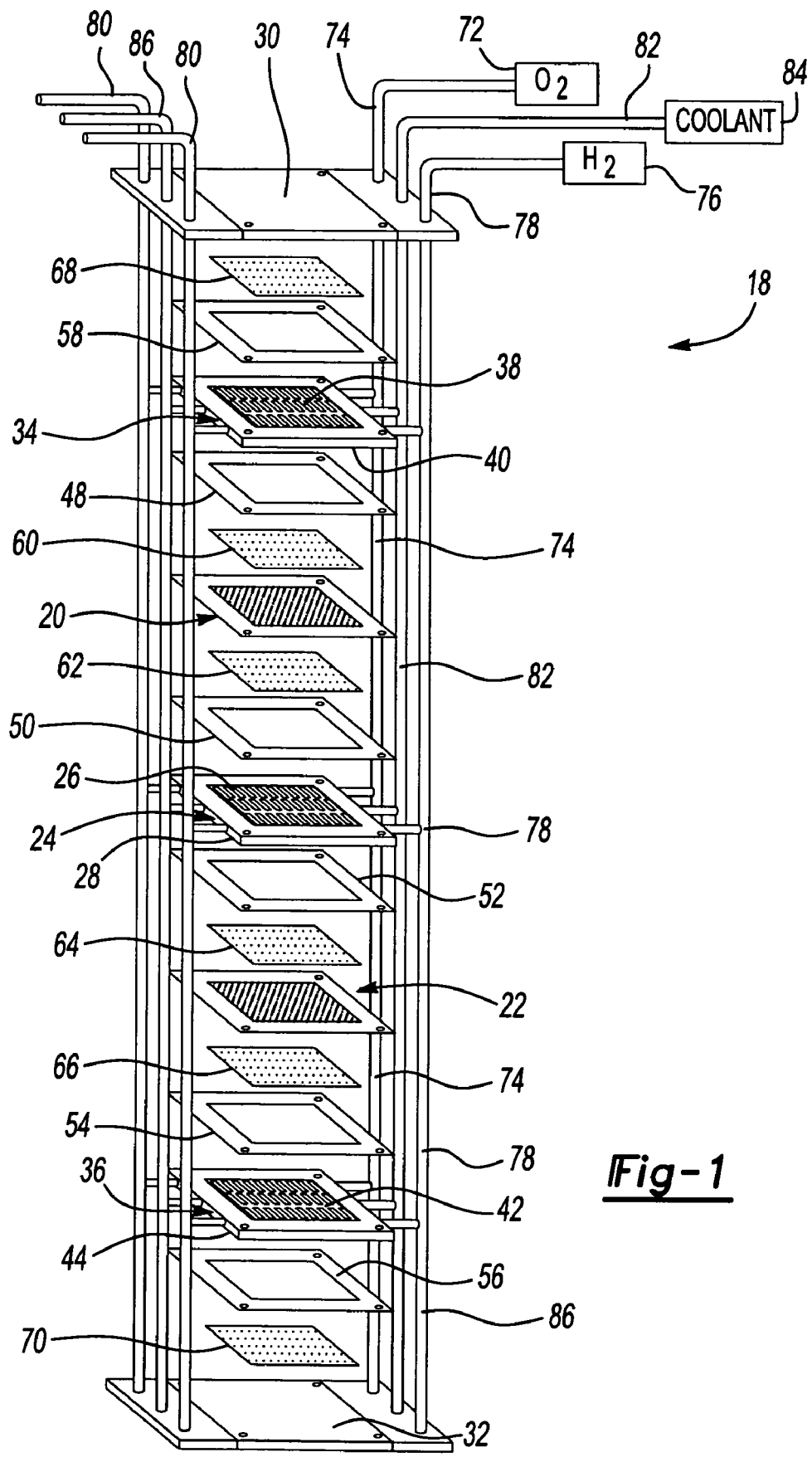
FIG. 1 is a schematic, exploded, isometric, illustration of a liquid-cooled PEM fuel cell stack (only two cells shown)

To gain a better understanding of the present invention, an exemplary fuel cell stack 18 where the present invention may be employed is shown in FIG. 1. Fuel cell stack 18, as depicted, has two individual proton exchange membrane (PEM) fuel cells connected to form a stack having a pair of membrane-electrode-assemblies (MEAs) 20, 22 separated from each other by an electrically conductive, liquid-cooled, bipolar separator plate conductive element 24. An individual fuel cell, which is not connected in series within a stack, has a separator plate 24 with a single electrically active side. In a stack, a preferred bipolar separator plate 24 typically has two electrically active sides 26, 28 within the stack, each active side 26, 28 respectively facing a separate MEA 20, 22 with opposite charges that are separated, hence the so-called "bipolar" plate.

The MEAs 20, 22 and bipolar plate 24 are stacked together between stainless steel clamping terminal plates 30, 32 and end contact fluid distribution elements 34, 36. The end fluid distribution elements 34, 36, as well as both working faces or sides 26, 28 of the bipolar plate 24, contain a plurality of lands adjacent to grooves or channels on the active faces 38, 40, 26, 28, 42, and 44 for distributing anode reactant (fuel) and cathode reactant (oxidant) gases (i.e., $H_2$ and $O_2$) to the MEAs 20, 22. Nonconductive gaskets or seals 48, 50, 52, 54, 56, and 58 provide seals and electrical insulation between the several components of the fuel cell stack. Gas-permeable conductive diffusion media members 60, 62, 64, and 66 press up against the electrode faces of the MEAs 20, 22. Additional layers of conductive media members 68, 70 are placed between the end contact fluid distribution elements 34, 36 and the terminal collector plates 30, 32 to provide a conductive pathway therebetween when the stack is compressed during normal operating conditions. The end contact fluid distribution elements 34, 36 press up against the diffusion media members 60, 68 and 66, 70 respectively.

Oxygen is supplied to the cathode side of fuel cell stack 18 from storage tank 72 via appropriate supply plumbing 74, while hydrogen is supplied to the anode side of the fuel cell from storage tank 76, via appropriate supply plumbing 78. Alternatively, air may be supplied to the cathode side from the ambient, and hydrogen to the anode from a methanol or gasoline reformer, or the like. Exhaust plumbing 80 for both the $H_2$ and $O_2$/air sides of the MEAs is also provided. Additional plumbing 82 is provided for circulating coolant from a storage area 84 through the bipolar plate 24 and end plates 34, 36 and out the exit plumbing 86.

Figure 2:
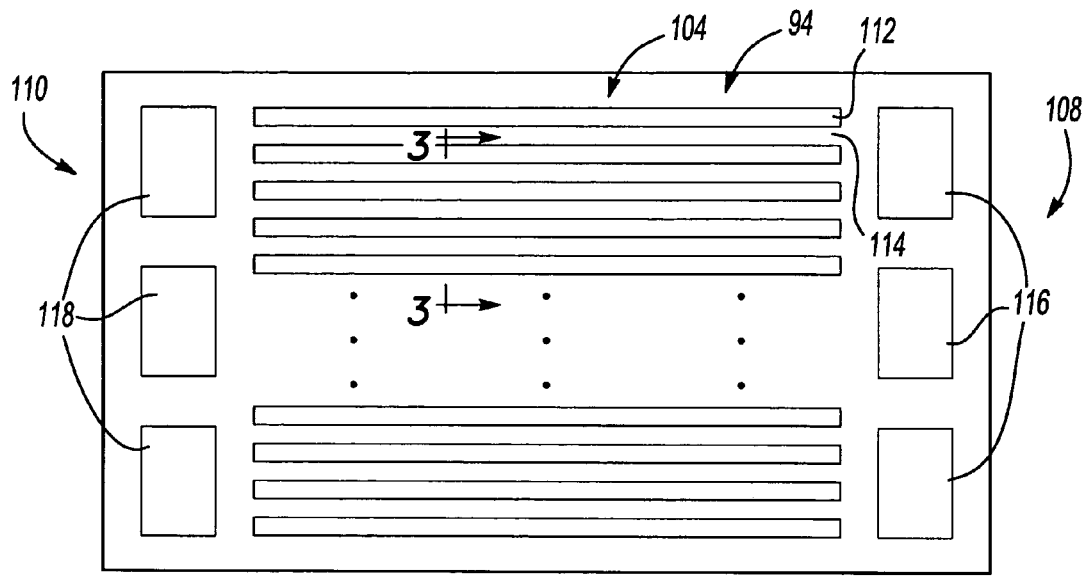
FIG. 2 is a top-plan view of an exemplary bipolar plate of the present invention.
Figure 3A:
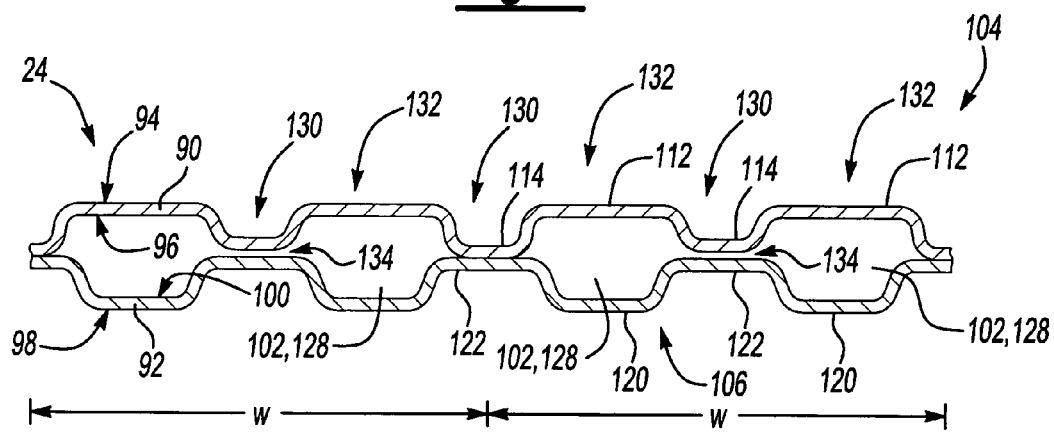
FIGS. 3A and 3B are partial cross-sectional views of a portion of the preferred embodiment and an alternate embodiment, respectively, of the bipolar plate of FIG. 2 along line 3-3.

Referring to FIGS. 2 and 3A, an exemplary bipolar plate 24 according to the principles of the present invention is shown. Bipolar plate 24 comprises first and second metal sheets 90, 92 that are attached together to form bipolar plate 24. Each sheet 90, 92 is made as thin as possible (e.g., about 0.002-0.02 inches thick), and may be formed by stamping, by photo etching (i.e., through a photo lithographic mass), electroforming, or any other conventional process for shaping metal sheets. Alternatively, each sheet 90, 92 of bipolar plate 24 can be formed from a nonmetallic material, such as a polymeric material, and formed into the sheets using conventional processes for shaping polymeric materials. First sheet 90 has opposite external and internal surfaces 94, 96. Similarly, second sheet 92 has opposite external and internal surfaces 98, 100. Internal surfaces 96, 100 of first and second sheets 90, 92 face one another and form an internal cavity or coolant passageway 102 through which a coolant will flow. External surfaces 94, 98 of first and second sheets 90, 92 face MEAs 20, 22 and are formed so as to provide flow fields 104, 106 through which the anode and cathode reactants flow from one end 108 of bipolar plate 24 to another end 110 thereof.

As shown in FIG. 2, flow field 104 on external surface 94 of first sheet 90 extends between first and second ends 108, 110. Flow field 104 includes a plurality of lands 112 that extend outwardly and which define therebetween a plurality of grooves or channels 114. When the fuel cell is fully assembled, lands 112 press against the diffusion media members, such as 62 or 64 in FIG. 1, which, in turn, press against the MEAs (such as 20 or 22 in FIG. 1, respectively). The cathode or anode reactant stream flows through the channels 114 between lands 112 when traveling from first end 108 to second end 110. For drafting simplicity, FIG. 2 depicts only a portion of a simplified flow field 104 and flow field 104 is shown as providing a substantially straight path between first and second ends 108, 110. In reality, flow field 104 will substantially cover the entire external surface 94 of first sheet 90 that engages with the diffusion media members. Additionally, the lands 112 and channels 114 may also be oriented to provide a tortuous path across first sheet 94. For example, lands 112 and channels 114 can be arranged into a serpentine configuration, a zigzag configuration, and configurations wherein the flow travels between first and second ends 108, 110 multiple times before exiting channels 114, thereby providing a tortuous path. The anode or cathode reactant gas is supplied to channels 114 from a header or manifold 116 that lies along one end 108 of the fuel cell, and exits channels 114 through one of the headers 118 at second end 110 of the fuel cell. The particular headers that are not being used to supply fluid to the flow field are blocked from allowing the fluids therein from flowing into channels 114. Each of the headers 116, 118 is in fluid communication with an appropriate supply and exhaust plumbing for the anode reactant, cathode reactant, and coolant.

The flow field 106 on external surface 98 of second sheet 92 is similar to a flow field 104 on first sheet 90 discussed above. Accordingly, flow field 106 is not discussed in detail. As shown in FIG. 3A, flow field 106 also includes a plurality of lands 120 which define therebetween a plurality of grooves or channels 122 through which one of the anode and cathode reactants flows.

When first and second sheets 90, 92 are attached together to form bipolar plate 24, flow fields 104, 106 form a flow field 128 within coolant passageway 102. That is, the channels and lands on the external surfaces of sheets 90, 92 form corresponding lands and channels, respectively, on the internal surfaces of sheets 90, 92 that form flow field 128. The shape of flow fields 104, 106 are designed to be complementary to one another so that when first and second sheets 90, 92 are attached together to form bipolar plate 24, lands 112, 120 and channels 114, 122 are aligned with one another. Channels 114, 122 thereby form a plurality of opposing pairs of lands 130. Lands 112, 120 thereby form a plurality of opposing pairs of channels 132 between the opposing pairs of lands 130. As a result, at least a majority of coolant flow field 128 is defined by opposing pairs of lands 130 and opposing pairs of channels 132 through which the coolant fluid flows from one end 108 to the other end 110 of bipolar plate 24.

In prior art bipolar plates all the opposing pairs of channels are in contact with one another. In contrast, in bipolar plates 24 according to the principles of the present invention the dimensions of the channels 114, 122 on first and second sheets 90, 92 are dimensioned so that some opposing pairs of lands 130 in coolant flow field 128 are in contact with one another while other opposing pairs of lands 130 of coolant flow field 128 are spaced apart with a gap 134 therebetween.

Figure 3B:
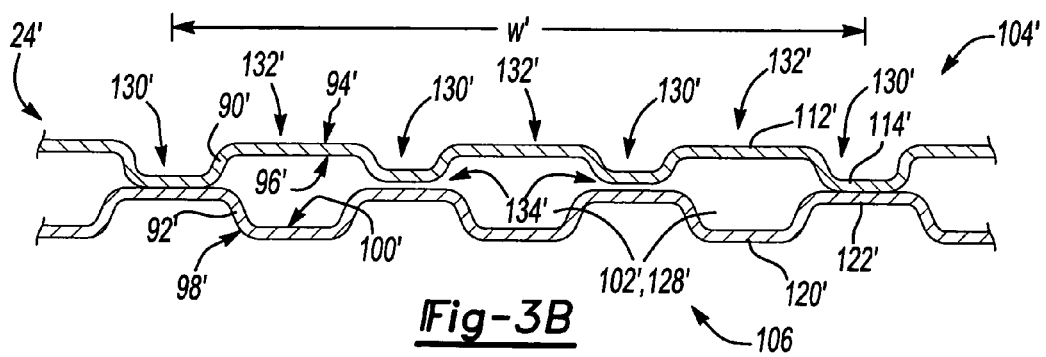

The opposing pairs of lands 130 that are in contact with one another are preferably attached to one another by brazing, bonding with an adhesive, laser welding, or the like. The opposing pairs of lands 130 with a gap 134 therebetween are arranged relative to the opposing pairs of lands 130 in contact to provide bipolar plate 24 with a desired compliance. As a result, the span W between opposing pairs of lands 130 that are in contact with one another can be changed to provide a desired compliance for bipolar plate 24. For example, as shown in FIG. 3A, opposing pairs of lands 130 having gap 134 therebetween can be interposed between adjacent opposing pairs of lands 130 in contact with one another. This configuration thereby effectively doubles the span W of a bipolar plate 24 made according to the principles of the present invention over a prior art bipolar plate where all opposing pairs of lands are in contact with one another. Alternatively, as shown in FIG. 3B, the span W' can be increased by providing a group of at least two opposing pairs of lands 130' with gaps 134' between adjacent opposing pairs of lands 130' that are in contact with one another. As a result, span W' of bipolar plate 24' in FIG. 3B is effectively one and one-half the span W of bipolar plate 24 shown in FIG. 3A. The larger span W' of bipolar plate 24' results in bipolar plate 24' having a larger compliance than bipolar plate 24 having shorter span W. Thus, the compliance of the bipolar plate can be adjusted to a desired level by the arrangement of opposing pairs of lands 130 that are in contact and that have a gap 134 therebetween.

Figure 4:
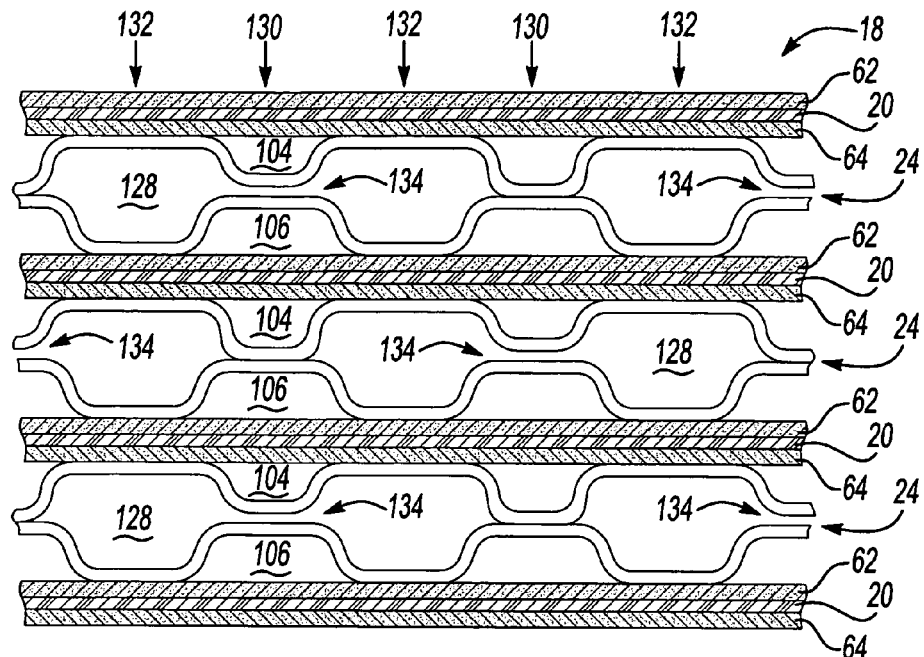
FIG. 4 is a partial cross-sectional view of a fuel cell stack using bipolar plates according to the principles of the present invention.

Referring now to FIG. 4, a partial cross-sectional view of a pair of bipolar plates 24 within a fuel cell stack 18 comprising multiple fuel cells is shown. In the fuel cell stack, a plurality of MEAs 20 and diffusion media members 62, 64 are sandwiched between a plurality of bipolar plates 24. The opposing pairs of lands 130 that are in contact with one another and that are spaced apart with a gap 134 therebetween are arranged so that bipolar plate 24 has a desired compliance for the nominally expected compressive forces to be experienced and/or imparted upon the individual fuel cells and the fuel cell stack. Specifically, bipolar plates 24 are configured to have a compliance that is greater than that of a traditional bipolar plate. Preferably, bipolar plates 24 are configured to have a compliance that is at least about one-half as large as a compliance of the diffusion media members 62, 64. Even more preferably, bipolar plates 24 are configured to have a compliance that is at least as large as the compliance of the diffusion media members 62, 64. Most preferably, bipolar plates 24 are configured to have a compliance that is greater than the compliance of the diffusion media members 62, 64. Typically, the compliance of the diffusion media members 62, 64 is greater than that of MEA 20. Thus, the compliance of bipolar plates 24 may have a compliance that is also greater than that of MEA 20. With the bipolar plates 24 having a compliance that is greater than that of a traditional bipolar plate, improvements in the compressive force within the individual fuel cells and/or stack can be achieved. Preferably, bipolar plates 24 are configured so that opposing pairs of lands 130 with a gap 134 therebetween are offset or staggered from opposing pairs of lands 130 with a gap 134 therebetween in an adjacent bipolar plate. In other words, as shown in FIG. 4, the opposing pairs of lands 130 with a gap 134 therebetween in adjacent bipolar plates 24 are offset from one another. The staggering of gaps 134 in adjacent bipolar plates 24 more evenly distributes the compressive load across the entire surfaces of bipolar plates 24 and throughout the individual fuel cells. However, it should be appreciated that some gaps 134 in adjacent bipolar plates 24 may be aligned with one another, if so desired.

The dimension of gap 134 also affects the compliance of bipolar plate 24. When bipolar plate 24 is initially compressed as part of the initial compressive state of fuel cell stack 18, gap 134 will diminish as bipolar plate 24 is deformed. The amount of deformation of bipolar plate 24 will depend upon the compliance of bipolar plate 24 relative to the compliance of other components in the fuel cell stack along with the compressive force imparted upon the fuel cell stack. Preferably, bipolar plate 24 is designed to experience only elastic deformation in response to the compressive force imparted on fuel cell stack 18 and also due to dimensional changes in the individual fuel cells and/or stack. The elastic deformation ensures that bipolar plate 24 will attempt to return back to its original non-deformed state. Thus, when dimensional changes in a fuel cell and/or in the fuel cell stack occurs, bipolar plate 24 will elastically deform in response to the dimensional change. The size of the gaps 134 will thereby increase or decrease with the dimensional changes occurring within the fuel cells and/or fuel cell stack. Because bipolar plate 24 is initially elastically deformed due to the initial compressive state imparted on fuel cell stack 18, increasing and decreasing dimensional changes will cause gap 134 to decrease or increase as bipolar plate 24 resists further deformation or attempts to return to its original non-deformed state.

Preferably, gap 134 is dimensioned so that during nominal operation of fuel cell stack 18, gap 134 always remains and the associated pairs of lands 130 remain spaced apart at all times. However, if desired, gap 134 can be dimensioned so that upon a compressive load or dimensional change of a predetermined magnitude, gap 134 is non-existent and the associated opposing pairs of lands 130 contact one another. When this occurs, the compliance of bipolar plate 24 will change as the span W has thereby been decreased due to the contact of the normally spaced-apart opposing pairs of lands. It is envisioned that when fuel cell stack 18 is subjected to a sufficient jolt the opposing pairs of lands 130 normally having a gap 134 therebetween may briefly contact one another. For example, when fuel cell stack 18 is used in a vehicle, and that vehicle encounters a pothole in the road, the jolt may be sufficient to cause opposing pairs of lands 130 that are normally spaced apart to briefly contact one another. This may be desirable to avoid or minimize stresses that would otherwise result on other components as a result of the jolt. For example, the limited deformation of the bipolar plate as a result of the normally spaced apart pair(s) of opposing lands contacting one another may prevent tearing of the diffusion media members. However, it should be appreciated that a pothole of a sufficient magnitude to cause the opposing pairs of lands that are normally spaced apart to contact one another is not considered nominal operation of the fuel cell stack. The dimensional changes that may occur within the fuel cells and fuel cell stack during nominal operation can be predicted and/or measured. Based upon the nominal operation, bipolar plates 24 are preferably designed with a compliance that maintains the compressive load on the fuel cells and fuel cell stack within a predetermined range. This enables efficient operation of the fuel cells and fuel cell stack along with preventing undesirable stresses on the components of the fuel cells and fuel cell stack.

EXAMPLE 1

Figure 5:
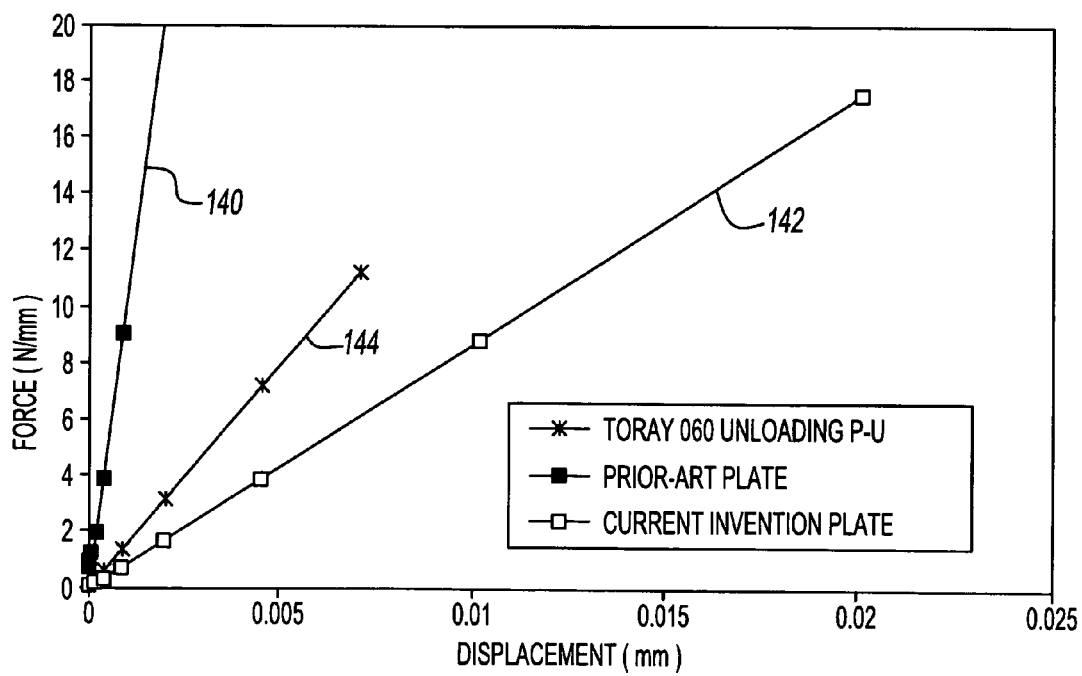
FIG. 5 is a graph of force versus displacement illustrating the stiffness of a prior art bipolar plate and a bipolar plate according to the principles of the present invention.

Referring now to FIG. 5, a comparison of the stiffness of a typical prior art bipolar plate to a bipolar plate of the present invention is shown along with a stiffness of a typical diffusion media member. In the prior art bipolar plate, all opposing pairs of lands within the coolant flow field were in contact with one another and brazed together. In the bipolar plate of the present invention, every other opposing pair of lands 130 were in contact with one another and brazed together while the remaining opposing pairs of lands had a gap 134 therebetween. The typical diffusion media member was a Toray 060 paper. The bipolar plates and the Toray paper were individually compressed between two rigid surfaces and the resulting stiffness curves were generated using the finite element method. Based on this method, curves 140, 142 and 144 for the respective prior art bipolar plate, bipolar plate of the current invention, and Toray 060 paper were developed. The slopes of these curves are the stiffness or the inverse of compliance of that component. The Toray 060 paper was loaded up to a compression of 300 PSI. As shown in the graph, the bipolar plate of the current invention is significantly more compliant than the prior art bipolar plate. Additionally, the bipolar plate of the present invention is also more compliant than the Toray 060 paper. It should be appreciated, however, that the compliance of a bipolar plate according to the principle of the present invention need only be more compliant than that of a prior art bipolar plate for at least some of the benefits of the present invention to be realized.

EXAMPLE 2

To evaluate how much reduction of over compression the bipolar plate of the present invention can achieve, the contact pressure in a single cell consisting of two bipolar plates, two 0.18 mm-thick diffusion media members, and an MEA with a 0.018 mm-thick membrane was investigated. The diffusion media members were Toray 060 paper. The membrane was Gore 55 series with a swelling ratio of 0.38 in the thickness direction. The study was performed using the finite element method. After the cell was compressed to 450 PSI, the membrane was allowed to fully hydrate and swell while the two rigid surfaces on either side of the cell were fixed in place. It was found that an additional contact pressure of 45 PSI occurred in the land area after the membrane was fully hydrated. When the same analysis was performed using a conventional prior art bipolar plate, additional contact pressure of 110 PSI was found. The results of this test suggest that the use of a bipolar plate of the present invention can reduce the over compression by 60%. Thus, the current invention provides an effective way of reducing the problem associated with dimensional changes occurring within the fuel cell stack.

Accordingly, the present invention provides for a construction for a bipolar plate for a fuel cell stack that enables the bipolar plate to be more compliant than prior art bipolar plates and to even be the most compliant member in the fuel cell stack. The bipolar plate can be configured to provide varying levels of compliance, as demanded by the design of the fuel cell stack. The bipolar plate can be more compliant than the diffusion media members and the active elements used to form the individual fuel cells. The compliant nature of the individual bipolar plates enables localized dimensional changes that occur within the fuel cell stack to be compensated by a localized deformation of the portions of the bipolar plate within that region.

It should be appreciated that the description of the invention is merely exemplary in nature and, thus, variations that do not depart from the gist of the invention are intended to be within the scope of the invention. The alternating arrangement between opposing pairs of lands 130 that are in contact with one another and that are spaced apart with a gap 134 therebetween can be altered from the configuration shown. For example, the opposing pairs of lands that are in contact with one another can be every other opposing pair, every third opposing pair, fourth, etc. Additionally, the configuration of the flow fields may necessitate a variety of these configurations to be employed to achieve a desired compliance for the bipolar plate and/or specific portions or areas of the bipolar plates. Furthermore, bipolar plates of the present invention can be used along with prior art bipolar plates to form a fuel cell stack, if desired. Accordingly, such variations are not to be regarded as a departure from the spirit and scope of the invention.

What is claimed is:

1. A fuel cell stack comprising a bipolar plate having an anode side, a cathode side, and an internal cavity between said anode and cathode sides with a flow field therein, said flow field being at least partially defined by opposing pairs of lands and opposing pairs of channels between said lands,
wherein some of said opposing pairs of lands are in contact with one another and others of said opposing pairs of lands are spaced apart from one another with a gap therebetween.

2. The fuel cell stack of claim 1, further comprising at least one diffusion media member and wherein said bipolar plate is at least two bipolar plates, said diffusion media member is compressed between adjacent bipolar plates, and said opposing pairs of lands in contact and with a gap therebetween are arranged so that said bipolar plates have a compliance at least as large as one half of a compliance of said diffusion media member.

3. The fuel cell stack of claim 2, wherein said compliance of said bipolar plates is at least as large as said compliance of said diffusion media member.

4. The fuel cell stack of claim 3, wherein said compliance of said bipolar plates is greater than said compliance of said diffusion media member.

5. The fuel cell stack of claim 1, wherein said anode side has an anode flow field, said cathode side has a cathode flow field, and said anode and cathode flow fields are at least partially defined by said opposing pairs of lands and opposing pairs of channels in said flow field in said cavity.

6. The fuel cell stack of claim 1, wherein said opposing pairs of lands in contact with one another are attached together.

7. The fuel cell stack of claim 1, wherein at least one of said opposing pairs of lands with a gap therebetween is disposed between two pairs of opposing lands in contact.

8. The fuel cell stack of claim 1, wherein at least two pairs of opposing lands with a gap therebetween are disposed between adjacent pairs of opposing lands in contact with one another.

9. The fuel cell stack of claim 1, wherein said bipolar plate is at least two bipolar plates and opposing pairs of lands with a gap therebetween in a first bipolar plate are offset from opposing pairs of lands with a gap therebetween in a second bipolar plate which is adjacent said first bipolar plate.

10. The fuel cell stack of claim 1, wherein said gap between opposing pairs of spaced apart lands is dimensioned to allow said opposing pairs of spaced apart lands to briefly contact one another when the fuel cell stack is subjected to a jolt.

11. The fuel cell stack of claim 1, wherein said gap between opposing pairs of spaced apart lands is dimensioned to prevent said opposing pairs of spaced apart lands from contacting one another during nominal operation of the fuel cell stack.

12. A fuel cell stack comprising:
a bipolar plate having opposite anode and cathode surfaces, said bipolar plate having an internal coolant passageway between said anode and cathode surfaces with a coolant flow field at least partially defined by opposing pairs of lands and opposing pairs of channels between said lands; and
at least one diffusion media member compressed against one of said anode and cathode surfaces of said bipolar plate,
wherein a compliance of said bipolar plate is greater than about one half of a compliance of said diffusion media member and some of said opposing pairs of lands are in contact with one another and others of said opposing pairs of lands are spaced apart with a gap therebetween.

13. The fuel cell stack of claim 12, wherein said gap is dimensioned to provide a compliance for said bipolar plate that is at least as large as said compliance of said diffusion media member.

14. The fuel cell stack of claim 13, wherein said gap is dimensioned to provide a compliance for said bipolar plate that is greater than said compliance of said diffusion media member.

15. The fuel cell stack of claim 12, wherein said pairs of opposing lands that are in contact and that are spaced apart are arranged relative to one another so that a span of said bipolar plate between opposing pairs of lands that are in contact provides a compliance for said bipolar plate that is at least as large as said compliance of said diffusion media member.

16. The fuel cell stack of claim 15, wherein said span of said bipolar plate provides a compliance for said bipolar plate that is greater than said compliance of said diffusion media member.

17. The fuel cell stack of claim 12, wherein a group of said pairs of opposing lands are arranged with at least one pair of opposing lands with a gap therebetween disposed between pairs of opposing lands that are in contact.

18. The fuel cell stack of claim 12, wherein said bipolar plate is one of a plurality of bipolar plates, said bipolar plates are arranged adjacent one another with at least one of said diffusion media members compressed between each pair of adjacent bipolar plates, and each opposing pair of lands with a gap therebetween in each of said bipolar plates is offset from each opposing pair of lands with a gap therebetween in adjacent bipolar plates.

19. The fuel cell stack of claim 12, further comprising an active element compressed against said at least one diffusion media member and wherein said compliance of said bipolar plate is greater than a compliance of said active element.

20. The fuel cell stack of claim 12, wherein said anode and cathode surfaces each have a flow field at least partially defined by said lands and channels of said coolant flow field.

21. A fuel cell stack comprising:
a first plate having opposite first and second sides with respective first and second flow fields thereon, said first and second flow fields being at least partially defined by a plurality of lands with a plurality of channels therebetween, and said first side being an anode side; and
a second plate having opposite third and fourth sides with respective third and fourth flow fields thereon, said third and fourth flow fields being at least partially defined by a plurality of lands with a plurality of channels therebetween, and said fourth side being a cathode side,
wherein said first and second plates are coupled together with said second and third flow fields facing one another and at least partially defining an internal cavity, said lands on said facing second and third flow fields forming pairs of opposing lands, and another some of said opposing pairs of lands are in contact with one another and others of said opposing pairs of lands are spaced apart from one another with a gap therebetween.

22. The fuel cell stack of claim 21, further comprising a plurality of diffusion media members and wherein different ones of said diffusion media members are compressed against said first and fourth flow fields.

23. The fuel cell stack of claim 21, wherein said opposing pairs of lands in contact with one another are attached together.

24. The fuel cell stack of claim 21, wherein at least one of said opposing pairs of lands with a gap therebetween is disposed between two pairs of opposing lands in contact.

25. The fuel cell stack of claim 21, wherein at least two pairs of opposing lands with a gap therebetween are disposed between adjacent pairs of opposing lands in contact with one another.

26. The fuel cell stack of claim 21, wherein said bipolar plate is at least two bipolar plates and opposing pairs of lands with a gap therebetween in a first bipolar plate are offset from opposing pairs of lands with a gap therebetween in a second bipolar plate which is adjacent said first bipolar plate.

27. The fuel cell stack of claim 21, wherein said gap between opposing pairs of spaced apart lands is dimensioned to allow said opposing pairs of spaced apart lands to briefly contact one another when the bipolar plate is subjected to a jolt.

28. The fuel cell stack of claim 21, wherein said gap between opposing pairs of spaced apart lands is dimensioned to prevent said opposing pairs of spaced apart lands from contacting on another during nominal operation of the bipolar plate.

* * * * *